Aug. 5, 1947.                C. D. PETERSON ET AL                2,425,204
                              GEAR SHIFTING MECHANISM
                                Filed May 26, 1945
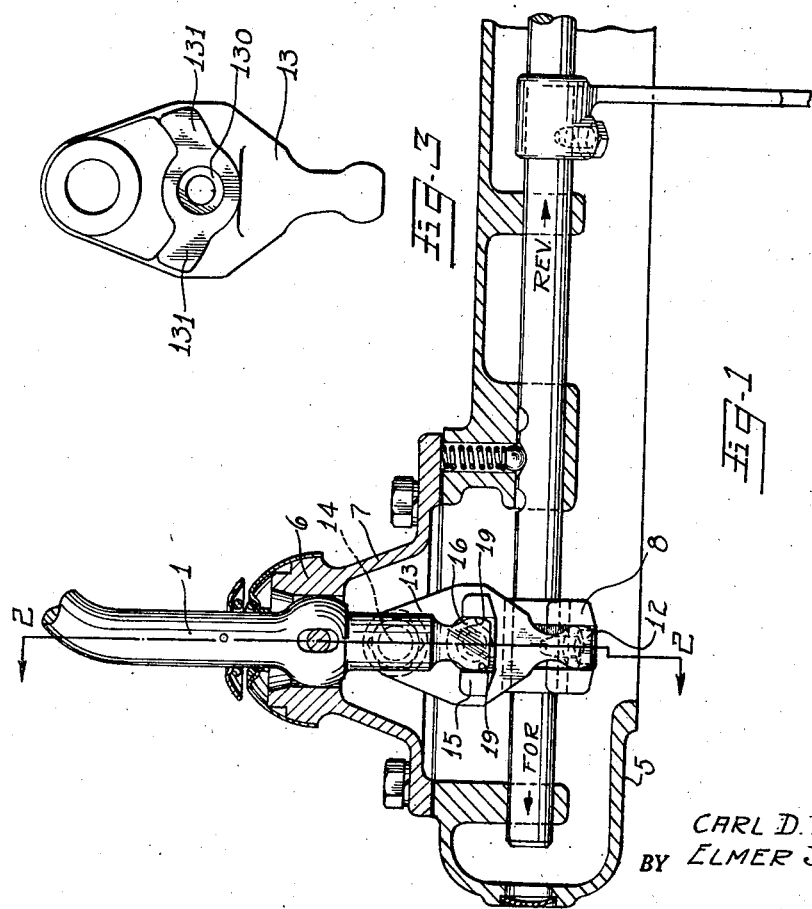
INVENTORS
CARL D. PETERSON
BY ELMER J. BARTH
Bodell ~ Thompson
ATTORNEYS Patented Aug. 5, 1947

2,425,204

UNITED STATES PATENT OFFICE 2,425,204

GEAR SHIFTING MECHANISM

Carl D. Peterson and Elmer J. Barth, Toledo, Ohio; Marion F. Peterson, executrix of Carl D. Peterson, deceased, assignors to Dana Corporation, Toledo, Ohio, a corporation of Virginia Application May 26, 1945, Serial No. 596,026

2 Claims. (Cl. 74—473)

This invention relates to gear shifting mechanism and has for its object means by which a uniform movement of the hand shifting lever during all shifts is obtained regardless of the differences in shifting movement of the clutches or gears shifted. The selecting and gear shifting levers usually have a selecting movement to select any one of a plurality of shifters or shift rods and a fore-and-aft movement, when in any selected position, the shift lever or its selecting finger coacting directly with the rods or blocks thereon. More specifically, the object of this invention is an intermediate motion transmitting member of the lever order arranged to be selected by the selecting movement of the hand shifting lever instead of the shift rod which the intermediate lever shifts, the intermediate lever varying or multiplying the movement of the hand lever to a shift rod that has a different, as a longer shifting movement, than the other or other shift rods capable of being operated by the hand shifting lever.

The invention consists in the novel features and in the combinations and constructions hereinafter set forth and claimed.

In describing this invention, reference is had to the accompanying drawings, in which like characters designate corresponding parts in all the views.

Figure 1 is a fragmentary elevation of a shifting mechanism embodying this invention, the contiguous portion of the cover of the gear box in which the shifting mechanism is mounted being also shown.

Figure 2 is a sectional view, partly in elevation, on the plane of line 2—2, Figure 1.

Figure 3 is a detail view through the intermediate motion transmitting lever of the shift mechanism, on the plane of line 3—3, Figure 2.

This invention comprises means for transmitting a shifting movement of different extent or length to one, or at least one, of a plurality of shifters, from that transmitted to another shifter, from a selecting and shifting lever having a uniform or equal fore-and-aft shifting movement from neutral in any lateral selected position. More specifically, the invention includes a motion transmitting member, as an intermediate lever, between the selecting and shifting lever and at least one of the shifters or slide rods, the intermediate lever having a different fulcrum and being of a different radius from the fulcrum and radius of the shifting lever; and being located to be selected or engaged during the selecting movement of the hand shifting lever when the shift rods are in neutral position, and to shift the rod to which it is connected during the fore-and-aft movement. Thus, the shifting lever selects at least one rod to be shifted through the intermediate lever. The purpose of the intermediate lever is to maintain the amount of fore-and-aft movement of the shifting lever for all shifts substantially uniform when shifting a rod having a short shifting movement and when shifting a rod having a longer shifting movement.

I designates the hand shifting lever. 2, 3 and 4 are shifters as shift rods slidably mounted in a box or cover 5 which is usually the cover of the gear box or a change-speed transmission gearing. The lever I is pivoted at 6 in a tower 7 on the cover 5, to have a lateral selecting and a fore-and-aft shifting movement. In the illustrated embodiment of the invention, three shift rods are shown for a five speed forward and reverse transmission. The rod 2 effects first speed forward and reverse, and usually has a different and longer movement than the rods 3, 4. The rod 3 effects second and third speeds forward, and the rod 4, fourth and fifth speeds forward. The rods are provided respectively with so-called blocks 8, 9 and 10 thereon having notches therein, the notches in the blocks 9, 10 being for receiving the finger 11 at the lower end of the hand shifting lever 1, and the notch in the block 8 on the shift rod 2 receiving the lower end or finger 12 of an intermediate motion transmitting lever 13. This intermediate lever is here shown as a lever of the third kind fulcrumed at 14 at one end as to a support for the shifting lever and the shift rods, as the tower 7, and extending downwardly across the shift rod 2, it having a block 15 between its ends to which the shifting power is applied. The block is formed with a notch 16 for receiving the finger 11 of the shifting lever 1. The lower end of the lever 13 is the work end. The notches of the blocks 9 and 10 and the notch 16 of the lever 13 are arranged in transverse alinement, when all the shift rods are in neutral, so that any one of the rods may be selected when all rods are in neutral position, the rod 2 being selected through the intermediate lever 13.

The rods 3, 4 have a uniform movement but the first speed forward and reverse rod has a greater movement from neutral than the rods 3, 4, and in order that the hand lever may have a uniform fore-and-aft movement in all lateral selected positions, the intermediate lever 13 is used to equalize or compensate for the greater or different distance traveled by the first speed forward and reverse rod 2 than the distance traveled by either of the rods, 3, 4.

A resistance or barrier means is provided against the selection of the intermediate lever 13. A feature of the invention is to relieve the shift lever of the resistance when the shift is initiated from neutral into low speed or reverse. As here shown, the barrier means includes a push plunger 17 carried by and extending through the lever 13 into the notch 16 through the bottom thereof, and a second plunger 18 pressed by a spring 180 located in a recess in the cover 5. The plunger 17 has a head or shoulder 170 at its inner end normally thrusting against the bottom of a recess 130 in the outer side of the lever 13, to limit the movement of the plunger 17 into the notch 16. The spring-pressed plunger 18 thrusts against the head 170. When the shift lever 1 is operated to cause the finger 11 to select the intermediate lever 13, the plunger 17 is pushed outward or to the right (Figure 2) against the force of the spring acting on the plunger 18. During the fore or aft shifting from neutral into reverse or low forward gear, one or the other of surfaces 131 on the outer or right side of the lever (Figure 2) sweeps across the end of the plunger 18, relieving the plunger 17 and also the finger 11 of the lever 1 of the force of the spring 180.

In selecting low and reverse speed rod 2 through the intermediate lever 13, the operator is required to exert force enough against the lever 1 during the selecting movement, to push the barrier plunger 17 to intentionally displace the barrier plunger against the action of a spring-pressed plunger 18 in order that the selecting finger 11 may enter the notch 16. During the fore-and-aft movement, the push plunger 18 slides along one or the other of the surfaces 131. The finger 11 thereof is held from lateral displacement when in any shifted position by side faces on the blocks, for instance, as the side faces 19 on the lever 13 (Figure 1). The side faces on the blocks of the shift rods are conventional, and per se form no part of this invention.

What we claim is:

1. In a gear shifting mechanism, the combination with a plurality of shifters and a selecting and shifting lever having fore-and-aft and lateral selecting movements; of a motion transmitting member connected to one of the shifters to vary the movement thereof relative to the other shifter or shifters, said member being arranged to be selected when all the shifters are in neutral position, and spring-pressed barrier means arranged to yieldingly resist selecting of the motion transmitting member by said lever, the barrier means including a plunger carried by said member and shiftable therewith and a second plunger normally thrusting against the former and held from shifting movement with said member, the member having a surface coacting with the second plunger during the fore or aft shifting of said member to relieve the first plunger from the force of the spring.

2. In a gear shifting mechanism, the combination with a plurality of shifters and a selecting and shifting lever having fore-and-aft and lateral selecting movements; of a motion transmitting member connected to one of the shifters to vary the movement thereof relative to the other shifter or shifters, said member being arranged to be selected when all the shifters are in neutral position, and spring-pressed barrier means arranged to yieldingly resist selecting of the motion transmitting member by said lever, the barrier means including a plunger carried by said member and shiftable therewith, a second plunger normally thrusting against the former and held from shifting movement with said member, the member having a surface coacting with the second plunger during the fore or aft shifting of said member to relieve the first plunger from the force of the spring, the spring of the spring-pressed barrier coacting with the second plunger and hence being stationary with respect to the shifting movement of the first plunger with the motion transmitting lever.

CARL D. PETERSON.
ELMER J. BARTH.

REFERENCES CITED

The following references are of record in the file of this patent:

UNITED STATES PATENTS

| Number | Name | Date |
|---|---|---|
| 2,197,938 | Lapsley et al. | Apr. 23, 1940 |